Nov. 1, 1960      C. T. LAKIN      2,958,135
COLLISION-COURSE DIRECTOR

Filed May 24, 1955      3 Sheets-Sheet 1

INVENTOR.
CHARLES T. LAKIN
BY
ATTORNEYS

Nov. 1, 1960 C. T. LAKIN 2,958,135
COLLISION-COURSE DIRECTOR

Filed May 24, 1955 3 Sheets-Sheet 2

INVENTOR.
CHARLES T. LAKIN
BY
ATTORNEYS

Nov. 1, 1960

C. T. LAKIN 2,958,135

COLLISION-COURSE DIRECTOR

Filed May 24, 1955

INVENTOR.
CHARLES T. LAKIN
BY
ATTORNEYS

United States Patent Office 2,958,135
Patented Nov. 1, 1960

2,958,135

COLLISION-COURSE DIRECTOR

Charles T. Lakin, 102B Ellis, China Lake, Calif.

Filed May 24, 1955, Ser. No. 510,875

9 Claims. (Cl. 33—46.5)

(Granted under Title 35, U.S. Code (1952), sec. 266)

The invention described herein may be manufactured and used by or for the government of the United States of America for governmental purposes without the payment of any royalties thereon or therefor.

The present invention relates to a course director and the like, and more particularly to a sight mechanism with fast and accurate means for directing a pilot to steer an attacking aircraft or the like on a collision course.

In dive or toss bombing or directing a projectile to a target it is desirable to indicate the aircraft collision course, or the intersection of the aircraft velocity vector with the ground during a dive, to the pilot, or autopilot, as quickly as possible. If the time for locating the collision course can be reduced, the danger time to the aircraft is correspondingly reduced. Heretofore, the most satisfactory method of finding the collision course was by means of a gyro sight of the type where the indicator moves whenever the aircraft changes any attitude angle. The usual systems are based on a servo loop which includes the pilot and a gyro. However, the major disadvantage of such systems is the slowness of operation. The pilot must keep tracking the target diligently for ten seconds or more before he knows the collision course has been changed sufficiently to guarantee he is on target. In addition to the solution time of such gyro sights being quite long, they contain no provision for the aircraft to make evasive maneuvers. The instant invention provides a sight which would present the collision course to the pilot almost instantaneously, and avoids the disadvantages inherent in prior sight arrangements. The invention comprises, generally, an optical system for sighting on a target, and driftmeters, placed at an angle to the optic axis, for determining the direction or magnitude of movements of objects on the ground with respect to the axis of a diving aircraft to locate the collision course.

An object of this invention is to provide a sight mechanism which would allow dive or toss bombing, for instance, with no other correction but gravity drop; a knowledge of wind, angle-of-attack, and angle-of-skid being unnecessary.

Another object is to provide accurate, practically instantaneous, self-aligning, driftmeters for navigational purposes.

A further object is to provide an accurate, practically instantaneous, driftmeter for determining the angle of drift or speed of an aircraft or the like with respect to the ground.

A still further object is to provide a collision course director which will accurately and instantaneously locate the collision course for the pilot or autopilot of an aircraft or air-borne device.

Other objects and many of the attendant advantages of this invention will be readily appreciated as the same become better understood by reference to the following detailed description when considered in connection with the accompanying drawings wherein.

Figure 1:
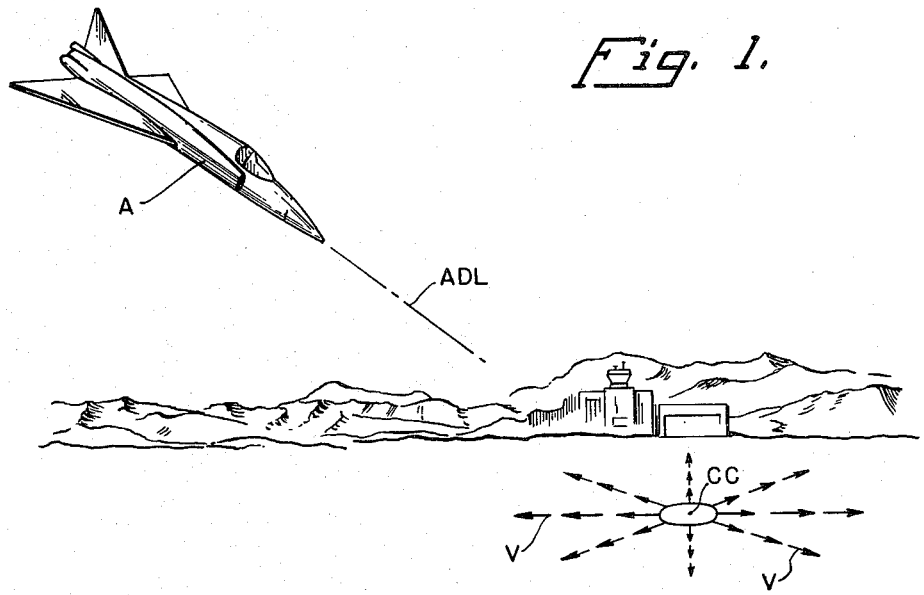
Fig. 1 is a perspective view of the field of action of a diving aircraft illustrating velocity vectors of ground images surrounding the collision-course terminus of the attacking aircraft.
Figure 2:
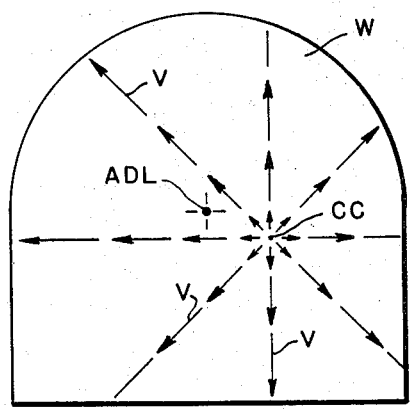
Fig. 2 is a diagrammatic view showing the ground image motions, or velocity vectors, surrounding the collision course, as seen through the windshield of a diving aircraft by the pilot.
Figure 3:
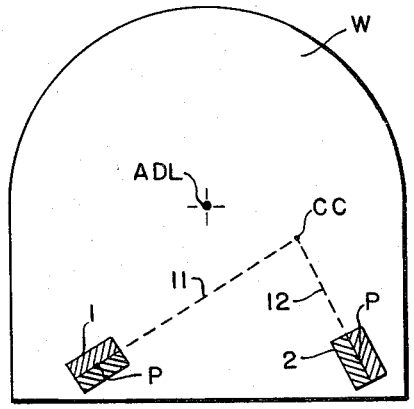
Fig. 3 is a diagrammatic illustration of locating the collision course by triangulation from two driftmeters, as seen through the windshield of a diving aircraft by the pilot.

The drawings show a form of the invention as applied to a sighting mechanism, or collision-course director, to be used in connection with bombing apparatus and the like for aircraft. Referring to Fig. 1 it will be noticed that the ground image motions or image velocity vectors V are directed away from the target or collision-course terminus CC of the diving aircraft A. The problem is to look at these images and measure their speed or directions to know where the collision-course is directed. Consider a pilot looking through the windshield W of his aircraft, Fig. 2. As he dives his aircraft toward the target the images on the ground get bigger as the aircraft gets nearer and nearer the ground. Since all of these images keep their relative positions, approximately, all the images are going outward from a point which the aircraft would run into if the pilot kept flying the aircraft on a straight course to the ground. This point, the source of image velocities of the objects on the ground, is the intersection of the collision-course with the ground, designated in Figs. 1 and 2 as CC. As shown the collision-course CC does not necessarily fall on the armament datum line of the aircraft, designated ADL in Figs. 1, 2 and 3. As stated, the problem is to make use of the image velocities V to indicate their origin, the location of the collision-course terminus CC. The image velocities have both magnitude (speed) and direction, both of which quantities may be exploited. The preferred embodiment of the invention makes use of the direction of the image velocities V. The direction of the image motion may be located by positioning "driftmeters" out away from the collision-course CC, and then triangulating from two such "driftmeters" to the source of the velocities, CC. The effect of such a pair of driftmeters is diagrammatically shown in Fig. 3. The driftmeters 1 and 2 each may have selsyn generators (not shown) attached to pivoting shafts P so that the angular position of each driftmeter can be reproduced in the pilot's sight by suitable means, for example mirrored lines rotated by selsyn motors driven by the driftmeter selsyn generators. Thus the pilot will see two reticle lines 11 and 12, representing the two neutral axes of the two driftmeters, intersecting on the collision-course terminus CC, as illustrated in Fig. 3.

Figure 4:
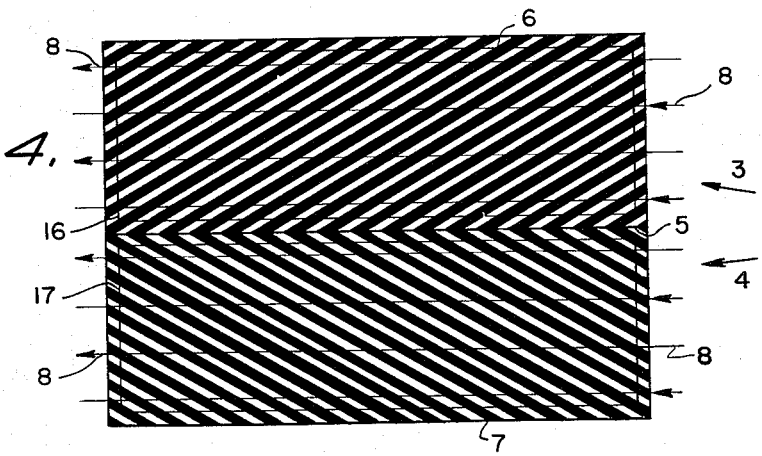
Fig. 4 is a diagrammatic representation of a driftmeter with each side generating equal frequencies.
Figure 5:
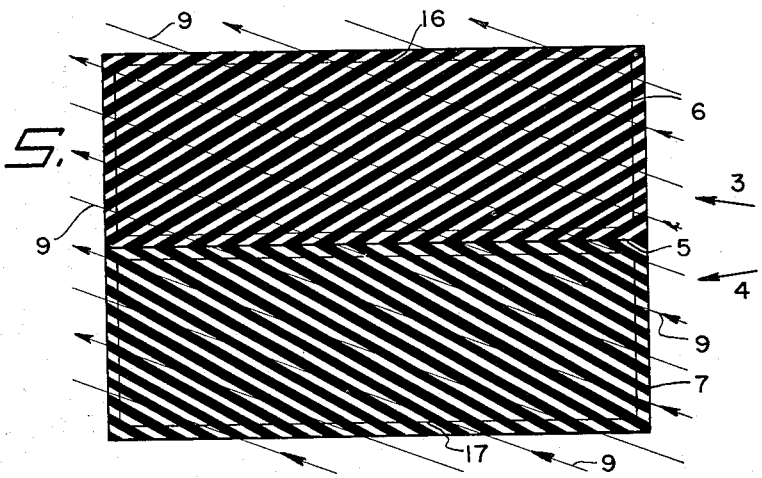
Fig. 5 is a diagrammatic representation of a driftmeter with the upper side generating a higher frequency than the lower side.

A "driftmeter" can be made by using a pair of "scanners" each constructed by putting a grid over a photocell. The two scanners are oriented with each other so that their grid lines are in such a relationship as shown in Figs. 4 and 5. The grid 6 of one scanner consists of lines at a plus angle (for example +15 degrees) to the line of the driftmeter neutral axis 5, the grid 7 of the other scanner is at an equal minus angle (for example −15 degrees) to the neutral axis 5. The grid lines and grid spaces are of equal width. Frequencies are generated by light images of various intensities crossing the grid lines, a pulse being generated each time a grid line is crossed. The frequency of these pulses is proportional to image rate. When the light images cross the grid lines in a direction nearly at right angles to the grid lines more pulses are generated than when the light images cross in a direction nearly parallel to the grid lines. If images pass along the image direction lines 8 of Fig. 4 the frequencies generated by the upper and lower photocells 16 and 17 are equal since the images are moving parallel to the neutral axis 5, the bisector of the angle between the two sets of grid lines 6 and 7. However, if the image velocities are passing along the image direction lines 9 of Fig. 5, the frequency generated by the lower photocell 17 is less than that of the upper photocell 16. In one embodiment of the invention, if a pair of scanners, 3 and 4 which comprise a driftmeter, is pivoted as a unit the frequency from one scanner will increase at the same time the frequency from the other decreases, Fig. 5. These two frequencies are compared; the difference between the two frequencies is used to find the direction of the image velocities with respect to the bisector 5 of the angle between the two sets of grid lines 6 and 7, and the pair of scanners 3 and 4 is pivoted until the frequencies are equal, Fig. 4. When the frequency generated by scanner 3 is equal to the frequency generated by scanner 4 the neutral axis 5 of the pair is pointing along the direction of indication, towards the required collision-course terminus. Two such pairs of scanners, or two such driftmeters, correctly positioned will locate the collision-course, as illustrated in Fig. 3.

Figure 6:
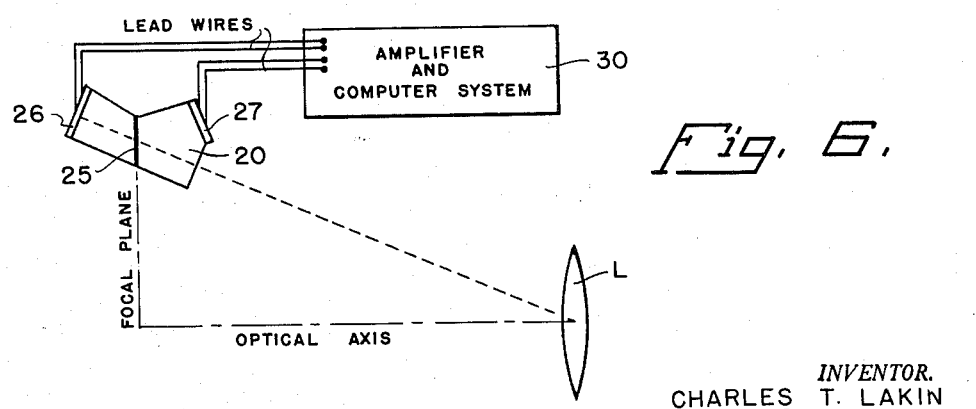
Fig. 6 is a diagrammatic view illustrating an arrangement of the transmission-reflection grid prisms of a driftmeter whose signals feed an amplifier and computer system.
Figure 7:
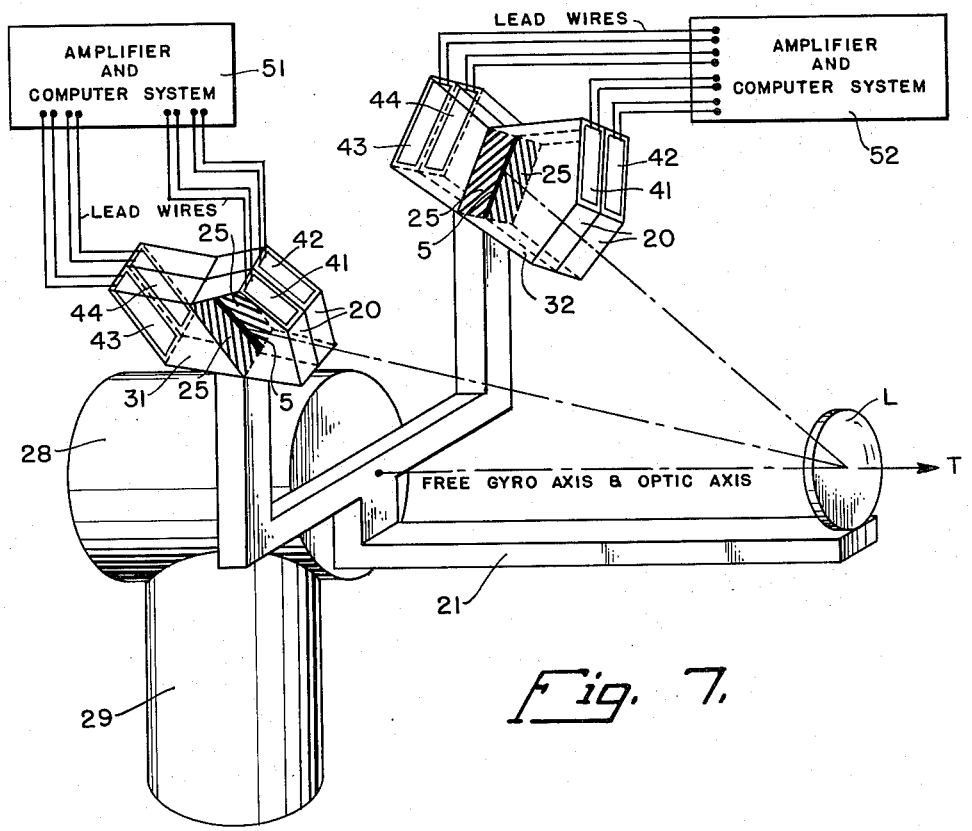
Fig. 7 is a partially diagrammatic perspective view of one form of collision-course director.

Scanners made of grid lines in front of a photocell have been made and used to generate frequencies like this for years. One of the greatest difficulties encountered is the large signal generated by the total intensity seen by the entire scanner not being constant. One way of decreasing this lack of constancy is to make a "dual scanner" consisting of two identical scanners with their grids shifted in such a manner that the first scanner grid lines are "looking" at the same place as the second scanner grid spaces. This "dual scanner" system can be accomplished with a prism arrangement as shown in Figs. 6 and 7, for example. In the arrangement of Fig. 6 the prism 20 is set off the optical axis of the lens L by some angle (approximately 20 degrees, for example). Within the prism 20 is a dual or transmission-reflection grid 25, which is placed in the focal plane of the lens L. The grid lines of grid 25 are mirror surfaced. Light from lens L falling on grid spaces is transmitted through the grid 25 and falls on photocell 26. Light from lens L falling on the mirror surfaced lines of grid 25 is reflected to the photocell 27. The output of photocells 26 and 27 of the "dual scanner" is fed by lead wires to an amplifier and computer system.

Another embodiment of the invention can be performed with an instrument as illustrated in Fig. 7, where the axis of the free gyro 28 is pointed in the direction of the target T. The optic axis of the lens system L mounted on supporting means 21 is collinear with the free gyro axis. The free gyro 28 is stable in azimuth and elevation (as seen by the pilot), and the vertical gyro 29 stabilizes the instrument in roll only.

The dual scanners 20 of Fig. 6 are shown in pairs as driftmeters 31 and 32 in Fig. 7, in perspective view. Each driftmeter 31 and 32 is shown to consist of two "dual scanners 20" placed side by side with their grids 25 oriented as in Figs. 4 and 5, and lying in the focal plane of lens system L; each driftmeter is positioned so that each neutral axis 5 or line bisecting the angle between the two sets of grid lines will intersect with each other and the free gyro and optic axis at right angles. The signals from photocells 41, 42, 43, 44 of each driftmeter are fed to an amplifier and computer system 51, 52 through attached lead wires.

Each driftmeter 31 and 32, Fig. 7, is mounted on supporting means 21 approximately 20 degrees off the optical axis, pointing downward toward the lens L at an angle of about 15 degrees and to the left, or right, about 15 degrees. (The size of angles are given merely by way of example.) Each grid 25 has lines sloped at an angle of approximately 15 degrees to the bisector, or neutral axis 5 of the driftmeter, as in Figs. 4 and 5. The signal outputs of the photocells are fed by lead wires to an amplifier system and to certain computer systems to indicate the amount and direction the collision-course CC is from the optic and free gyro axis of the director.

*Example*

Figure 8:
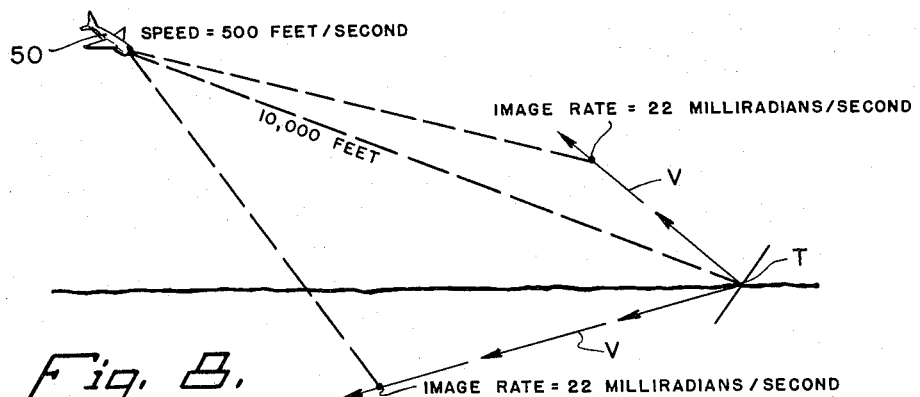
Fig. 8 is a diagrammatic perspective view illustrating an attacking aircraft using a collision-course director on a target.

Assume an aircraft 50 diving on a target T; see Fig. 8. The aircraft is 10,000 feet from the target flying at a rate of 500 feet per second. The sight lens of the collision-course director has an effective focal length of 8⅓ inches; the optic axis of the sight lens is pointed forward (probably along the datum line ADL of the aircraft) in the direction of the target T. The scanners, or driftmeters, are in the focal plane of the lens L, looking down 15 degrees and to the left, or right, 15 degrees, making a total of about 20 degrees off the optical axis of the collision-course director. Under these conditions the image-motion rate on each driftmeter is about 22 milliradians per second. With a lens of 8⅓ inches effective focal length used, and the scanner grid lines spaced 600 lines to the inch, such a grid-lens combination will give a scanner constant of 5000 (that is, whenever an agle of ⅕₀₀₀ radian is turned, one pulse, or cycle, is generated). Now, suppose the scanner grid lines were placed perpendicular to the image velocities in each driftmeter. We have a velocity of 22 milliradians per second with a cycle generated for each ⅕₀₀₀ radian (the scanner constant), or we generate 22×5=110 cycles per second. But since the grid lines were not perpendicular to the image velocities but are 15 degrees to them, the actual frequencies generated are 110× sin 15°=28 cycles per second.

The scanners on both sides of both driftmeters will be generating 28 cycles per second whenever the optical axis is pointing at the collision-course.

Assume in Fig. 8 that there is a 4 milliradian error in pointing the optical axis towards the collision-course. Each driftmeter then is pointing 40 minutes of arc in error since.

Arc sin (4/17.5÷20)=arc sin 0.0114=40 minutes

Therefore one side of each driftmeter is at 15° 40' to the image velocities and the other is at 14°20'. Now since $$\frac{\sin 15°40' - \sin 14°20'}{\sin 15°} = 8.7\%$$

the difference in frequency (or the error signal obtained by comparing the two signals) is 8.7% of 28 cycles per second or 28 c.p.s. × 8.7% = 2.4 c.p.s.

Thus the error signal generated by a 4 milliradian error from the collision-course will generate 2.4 cycles per second in this example.

The procedure to follow in using this collision-course director is:

(a) Point the free gyro (and optical) axis at the target. (This is done when the pilot puts the aircraft into a dive).

(b) Pilot uncages the gyros, i.e. "asks" the sight for data. The free gyro holds its axis and the optical axis in the direction of the target for the duration of the attack. The frequency difference of each driftmeter is measured; these differences are an indication of the amount and direction of the error between the direction the aircraft is flying and the direction of the target (or optical axis of the collision-course director). If the aircraft is on a collision-course with the target each driftmeter will generate frequencies which are equal from each of its grids. If the aircraft is not on a collision-course with the target the frequency generated by the two sides of each driftmeter will not be equal, and this difference in signal from the scanners in each driftmeter will indicate the amount and direction of the change necessary in the velocity vector.

(c) Corrective action is presented to the pilot or to the automatic pilot instantaneously and corrective action can be completed in 2 or 3 seconds, much faster than former systems.

Driftmeters of this invention as discussed and illustrated in the drawings can be mounted looking downward in horizontal flight and be used as dial-indicating, practically instantaneous, accurate, driftmeters for navigational purposes. This would overcome the disadvantages of the present measurement of drift which has always required a number of seconds or minutes to measure and usually a second person in the aircraft to adjust the equipment for measurement. The angle of drift is a necessary angle for horizontal bombing so a vertical-pointing driftmeter would be very valuable to horizontal bombing. The driftmeter of the present invention can also be used as a very fast and accurate method of obtaining ground speed by counting the frequency cycles generated as a measure of distance covered. Further, driftmeters may be placed in a guided missile scanning straight downward. By balancing the driftmeters, the direction of navigation with respect to the ground can be placed into the missile guidance system. Then the cycles generated by the driftmeters scanners can be counted for distance with respect to the ground, the altitude being known. If the direction and distance are controlled, there is nothing else to control except altitude (which is easy to control) for a hit on a ground target.

Obviously, many modifications and variations of the present invention are possible in the light of the teachings. It is therefore to be understood that within the scope of the appended claims the invention may be practiced otherwise than as specificaly described.

What is claimed is:

1. A device for locating the point of collision of an aircraft diving towards the earth's surface, comprising optical means mounted on the aircraft for looking towards the earth's surface, a plurality of mounted driftmeters placed in relative position with and off the optic axis of said optical means for determining the direction of movement of images on the earth's surface as seen by said optical means, said driftmeters each comprising an optical prism containing a pair of transmission-reflection grids of parallel mirror-surfaced lines, said grids lying in the same plane with their grid lines at equal angles to the line which bisects the angle between the two sets of grid lines, a pair of photocells for each grid positioned on surfaces of said prism in such an arrangement with said grids that light falling on grid spaces is transmitted through the grids and falls on one of the photocells for each grid and light falling on the mirror-surfaced grid lines is reflected to the other of the photocells for each grid, means electrically connected to said photocells for comparing signals generated by said photocells for determining the point from which said images appear to be moving.

2. A device as in claim 1 wherein the means for comparing signals generated by said photocells is a computer system.

3. A device as in claim 1 wherein the optical means comprises a lens and the grids of the driftmeters are substantially in the focal plane of said lens.

4. For an aircraft collision-course director, a driftmeter comprising an optical means containing a pair of grids having parallel mirror-surfaced lines, said grids lying in the same plane with their grid lines at equal angles to the line which bisects the angle between the two sets of grid lines, a pair of photocells for each grid positioned on surfaces of said optical means in such an arrangement with said grids that light falling on grid spaces is transmitted through the grids and falls on one of the photocells for each grid and light falling on the mirror-surfaced grid lines is reflected to the other of the photocells for each grid, and means electrically connected to said photocells for comparing the signals generated by said photocells.

5. For an aircraft course director, a driftmeter comprising an optical means containing a pair of grids of parallel lines lying in the same plane with their grid lines at equal angles to the line which bisects the angle between the two sets of grid lines, at least one photocell for each grid mounted in such a manner that light passing through the spaces betwen the grid lines falls upon a respective photocell, and means electrically connected to said photocells for comparing the signals generated by said photocells.

6. A device for locating the point of collision of an aircraft diving towards the earth's surface, comprising optical means mounted on the aircraft for looking towards the earth's surface, a plurality of pivotally mounted driftmeters placed in relative position with and off the optic axis of said optical means for determining the direction of movement of images on the earth's surface as seen by said optical means, said driftmeters comprising a pair of grids of parallel lines mounted side by side and lying in the same plane with the grid lines of each grid positioned at equal angles to the line which bisects the angle between the two sets of grid lines, a photocell mounted behind each grid in such a manner that light falling on a grid will pass through the grid spaces and fall upon the photocell causing an electric signal to be generated, and means electrically connected to said photocells for comparing the signals generated by said photocells and causing said driftmeters to pivot until they point along the direction of image movement.

7. A device as in claim 6 wherein the optical means comprises a lens and the grids of the driftmeter lie substantially in the focal plane of the lens.

8. A device as in claim 6 wherein the bisector of the angle between the two sets of grid lines points along the direction of image movement when each photocell signal is equal.

9. For an aircraft course director, a driftmeter comprising a pair of grids of parallel lines mounted side by side and lying in the same plane, the grid lines of each grid positioned at equal angles to the line which bisects the angle between the two sets of grid lines, a photocell mounted behind each grid in such a manner that light falling on a grid will pass through the grid spaces and fall upon the photocell causing an electric signal to be generated, and means electrically connected to said photocells for comparing the signals generated.

References Cited in the file of this patent

UNITED STATES PATENTS

| | | |
|---|---|---|
| 2,299,313 | Durgin | Oct. 20, 1942 |
| 2,425,541 | Konet | Aug. 12, 1947 |
| 2,432,613 | Fedde | Dec. 16, 1947 |